Jan. 15, 1946.      A. MACBETH      2,392,932
CLIP OR CLAMP FOR USE IN CONNECTING TOGETHER STRUCTURAL MEMBERS
Filed April 4, 1945
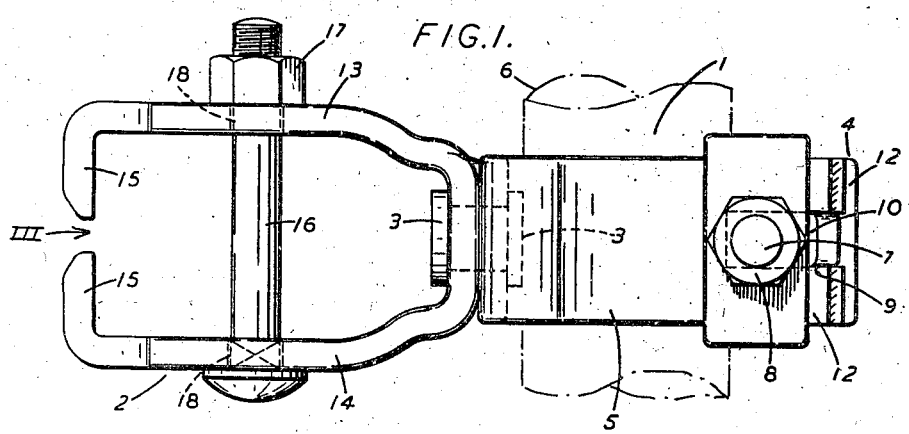
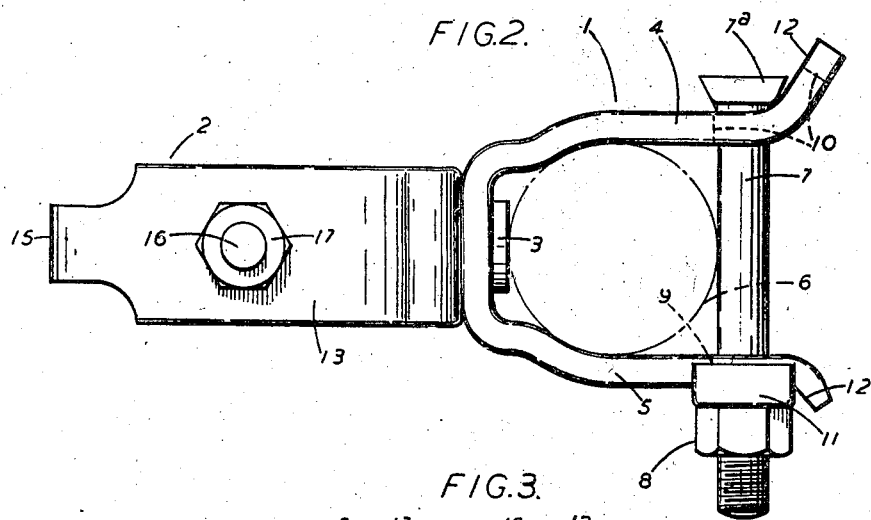
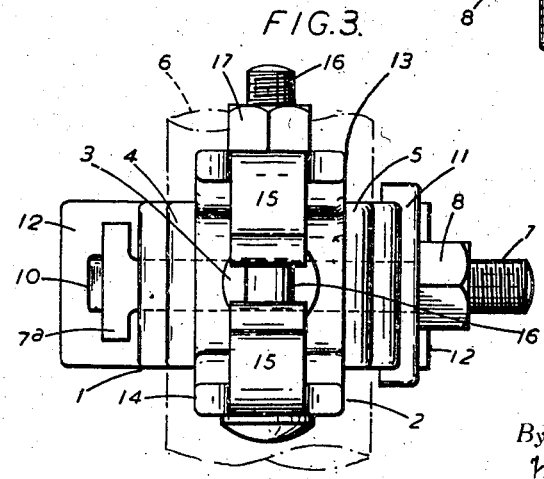
Inventor
ALLAN MACBETH.
By
Haseltine Lake & Co.
Attorneys.

Patented Jan. 15, 1946

2,392,932

UNITED STATES PATENT OFFICE 2,392,932

CLIP OR CLAMP FOR USE IN CONNECTING TOGETHER STRUCTURAL MEMBERS

Allan Macbeth, Bowden, Altrincham, England, assignor to Mills Scaffold Company Limited, London, England, a company of Great Britain Application April 4, 1945, Serial No. 586,503
In Great Britain October 2, 1944

2 Claims. (Cl. 304—40)

The invention relates to clips or clamps, an object of the invention being to provide a device for use in connecting together in a detachable manner structural members employed in the erection of shuttering, scaffolding, staging, fencing and for other analogous purposes. The invention is directed to a clip or clamp including two substantially U-shaped members the arms of which are adapted to be drawn, as by means of bolts, into engagement with the parts to be joined together or held in juxtaposition.

A feature of the invention according to one aspect is that at least one of the arms of the U-shaped members has a hooked end.

A feature of the invention according to another aspect is that the arms of at least one of the U-shaped members have hooked ends.

For drawing the arms towards one another when desired, use is preferably made of bolts passing through holes or slots in the arms and fitted with nuts. Where slots are used or included one or more of these may be open-ended to facilitate engagement of the bolts with the arms.

The U-shaped members may be joined together rigidly, pivotally or detachably.

In order that the invention may be more readily understood reference is now made to the accompanying drawing which illustrates one embodiment and in which:

Figure 1 is a side elevational view of the clip or clamp;

Figure 2 is a plan view, and

Figure 3 is an end elevational view looking in the direction of the arrow III in Figure 1.

In the embodiment illustrated, the clip or clamp consists of two U-shaped members generally indicated at 1 and 2, which are of strip metal having a degree of springiness or resiliency, these members being joined back to back by means of a rivet 3 permitting one member to be turned angularly with respect to the other.

The arms 4 and 5 of the U-shaped member 1 are shaped to embrace partially a structural part of circular or substantially circular cross-section, such as a scaffold pole of tubular steel indicated in broken lines at 6. To enable these arms to be drawn towards each other for the purpose of gripping the pole, a clamping bolt 7 with nut 8 is employed. The bolt is situated near the extremities of the arms and passes through an open-ended slot 9 in the arm 5 and through an elongated hole 10 in the other arm 4. The nut 8 applies its clamping pressure through the medium of a washer or saddle 11. The extremity of each of the arms is turned outwardly at an angle in the locality of the bolt as indicated at 12 so that when the bolt is tightened by screwing up the nut it has a tendency to move towards the base of the U-shaped member 1, thereby causing it to engage with the pole 6. In this way the pole will be held in the jaws of the U-shaped member by a three-point engagement. The said movement of the bolt on tightening may also, and as shown, serve to bring the pole into contact with the adjacent head of the aforesaid rivet 3 so that a four-point contact is thereby secured.

The provision of the open-ended slot 9 in the arm 5, coupled with the provision of the elongated hole 10 in the arm 4, permits the bolt to be swung outwardly on the fulcrum provided by its head 7a when the nut 8 is slackened sufficiently so that the mouth of the U-shaped member 1 can be opened to receive the structural part 6 without the necessity for completely removing the bolt from its U-shaped member.

The free ends of the arms 13 and 14 of the other U-shaped member 2 are bent inwardly towards one another to form hooks 15 adapted to engage with flanges, grooves or recesses provided upon or in adjacent members of shuttering of steel or other material (not shown) used in the process of casting concrete. For moving the hooks towards one another so as to draw the shuttering members into close contact with each other, use is made of a bolt 16 and nut 17, the bolt passing through holes 18 provided in the arms of the U-shaped member and situated substantially midway between the base of the member and the hooked ends of the arms. In the embodiment illustrated, the width of the hooked ends is less than the width of the remainder of the arms, but they may be of greater or the same width.

What I claim and desire to secure by Letters Patent of the United States is:

1. A clip or clamp comprising two substantially U-shaped members, means joining said members together back to back, a bolt passing through holes situated about midway in the length of the arms of one of said U-shaped members, said bolt having a nut, the free ends of said arms being bent towards one another to form hooks, a bolt passing through an open-ended slot at the extremity of one of the arms of the other U-shaped members and through an elongated hole in the other arm of this U-shaped member, said bolt having a nut, and the extremities of the second-mentioned arms being turned outwardly in the locality of their bolt.

2. A clip or clamp comprising two substantially U-shaped members, a rivet connection joining said members together back to back and permitting relative angular movement thereof, a bolt passing through holes situated about midway in the length of the arms of one of said U-shaped members, said bolt having a nut, the free ends of said arms being bent towards one another to form hooks, a bolt passing through an open-ended slot at the extremity of one of the arms of the other U-shaped members and through an elongated hole in the other arm of this U-shaped member, said bolt having a nut, and the extremities of the second-mentioned arms being turned outwardly in the locality of their bolt.

ALLAN MACBETH.